United States Patent [19]

Tan et al.

[11] Patent Number: 4,983,488

[45] Date of Patent: Jan. 8, 1991

[54] PROCESS FOR PRODUCING TONER FOR ELECTROPHOTOGRAPHY

[75] Inventors: Ryoji Tan; Shigeyoshi Tanaka; Ken-ichi Kishi; Yasuyuki Iguchi; Takeo Kudo; Takashi Amano; Hideki Kohno, all of Hitachi, Japan

[73] Assignee: Hitachi Chemical Co., Ltd., Tokyo, Japan

[21] Appl. No.: 501,733

[22] Filed: Mar. 30, 1990

Related U.S. Application Data

[63] Continuation of Ser. No. 724,202, Apr. 17, 1985.

[30] Foreign Application Priority Data

| | | | |
|---|---|---|---|
| Apr. 17, 1984 | [JP] | Japan | 59-77064 |
| Apr. 23, 1984 | [JP] | Japan | 59-81483 |
| Jan. 21, 1985 | [JP] | Japan | 60-8917 |
| Jan. 21, 1985 | [JP] | Japan | 60-8919 |
| Feb. 21, 1985 | [JP] | Japan | 60-8918 |

[51] Int. Cl.$^5$ ....................... G03G 9/087; C08L 29/04; C08L 27/12

[52] U.S. Cl. .................................... 430/137; 524/803; 524/805; 524/808; 524/827; 524/832

[58] Field of Search ................ 430/137; 524/803, 805, 524/808, 827, 832

[56] References Cited

U.S. PATENT DOCUMENTS

| | | | |
|---|---|---|---|
| 3,391,082 | 7/1968 | MacClay | 430/137 X |
| 4,473,628 | 9/1984 | Kasuya et al. | 430/137 X |
| 4,514,487 | 4/1985 | Kasuya et al. | 524/803 X |

FOREIGN PATENT DOCUMENTS

| | | | |
|---|---|---|---|
| 895943 | 3/1972 | Canada | 430/137 |
| 1404061 | 8/1975 | United Kingdom | 524/832 |
| 2070029 | 9/1981 | United Kingdom | 430/137 |

*Primary Examiner*—Roland Martin
*Attorney, Agent, or Firm*—Antonelli, Terry, Stout & Kraus

[57] ABSTRACT

A toner for electrophotography produced by polymerizing a monomer dispersed by emulsification in the presence of a colorant and/or a magnetic powder, followed by coagulation is excellent in properties, particularly in cleaning properties, charge stability and caking resistance.

15 Claims, No Drawings

PROCESS FOR PRODUCING TONER FOR ELECTROPHOTOGRAPHY

This is a continuation of application Ser. No. 06/724,202, filed Apr. 17, 1985.

BACKGROUND OF THE INVENTION

This invention relates to a process for producing a toner for electrophotography utilizing a polymerization process.

In electrophotography, a photosensitive material is charged uniformly with electricity, and the charged material is then exposed to an optical image formed to make extinct or decrease the charge on the part of the material irradiated by light and thereby to form an electrostatic latent image on the photosensitive material, and thereafter the latent image is developed with a developer containing a toner. The toner image thus developed is generally transferred to an appropriate transferring material and then fixed to form a so-called copy.

The developer used in the above-mentioned process basically comprises, as the principal components, a colorant for developing the electrostatic latent image and a binder for adhering the developed image to the transferring material. These developers are divided broadly into so-called wet (liquid) developers and dry developers.

The dry developers can be further divided into two-component developers and one-component developers. The former comprises a carrier and a toner, and the latter comprises a toner alone. In other words, two-component developers are those wherein toners having a polarity reverse to the electrostatic image required for developing the electrostatic image on the photosensitive material are obtained by triboelectric charging between the carrier and the toner, whereas one-component developers are those wherein the necessary charge is obtained by mutual friction of toners or friction between the toner and other parts of the developing machine.

Up to now, such toners for dry developers have generally been produced by a process which comprises melt-kneading a colorant such as carbon black and/or a magnetic powder such as magnetite powder into a thermoplastic resin to form a disperse material, then grinding said disperse material into particles of desired diameters by applying mechanically an impact force to the material by means of a suitable grinding apparatus and further, if necessary, subjecting the ground material to classification to obtain toners (this process is hereinafter referred to as "grinding process").

Further, in Japanese patent appln Kokoku (Post-Exam Publn) No. 10799/68, there has been proposed a process for producing perfectly spherical toner particles by spray-drying an emulsion obtained by emulsion polymerization.

Further, as to processes for producing toners utilizing a polymerization process for overcoming the difficulties of the grinding process, there have been proposed in Japanese patent appln Kokoku (Post-Exam Publn) No. 14895/76 and Japanese patent appln Kokai (Laid-Open) No. 53756/82 process for producing toners by suspension polymerization. Perfectly spherical toners can be obtained in processes utilizing suspension polymerization.

However, the grinding process requires a great amount of energy in melt-kneading and grinding. Moreover, the toner produced by the process has inevitably many defects.

Particularly, when a resin favorable for the melt-kneading step and the grinding step, for example an easily meltable resin, is employed, it causes cohesion (caking) of the toner during storage or fogging due to toner filming on the photosensitive material. Further, when an easily pulverizable resin is used, the toners are pulverized in the developing machine into fine toners, causing fogging of images and stains of the inside of the developing machine.

Moreover, the colorant dispersed in the resin tends to emerge to the surface of the pulverized toner. This gives rise to decrease in the quantity of triboelectric charge under high humidity conditions and falling off of the colorants in the developing machine. These in turn cause such unfavorable phenomena as stains of the carrier surface and stains of the surface of the photosensitive material.

On the other hand, it has been revealed that although toners obtained by utilizing emulsion polymerization-spray drying or suspension polymerization can overcome several of the difficulties of toners obtained by the grinding process, they bring about new difficulties. Namely, since the particles of toners thus obtained are perfectly spherical, the toners have a poor cleaning property. Further, since emulsifiers or suspending agents remain in the toner particles, the toners have decreased charge stability and decreased caking resistance.

In the meantime, as to the methods for fixing the electrostatic image in electrophotography, there have been known various methods including heated roll methods, pressure fixing methods, high-frequency heating methods and flash methods. The heated roll methods are most commonly used at present.

The heated roll methods include an oil coating method wherein a release agent such as silicone oil is coated on the roll surface, and an oilless method wherein a release agent such as silicone oil is not used and the fixing is effected by means of a roll using a material excellent in release property such as Teflon and silicone rubber. In both cases, there occurs a problem of offset phenomenon wherein the toner molten by heat transfers to the heated roll and stains the image-holding material such as paper.

Various methods have been proposed to prevent this offset phenomenon. One of the proposed methods comprises adding to the toner a resin comprising polyolefin as the principal component in order to improve the release property of the toner.

Also in the case of producing toners by suspension polymerization, there is known a process wherein an offset prevention agent is added in polymerization, as described in Japanese patent appln Kokoku (Post-Exam Appln) No. 13731/84 that ". . . comprising a step of polymerizing a monomer, which gives after polymerization a polymer which is a constituent of a dry type toner for heated-roll fixing type electrostatic image, in the presence of an offset prevention agent".

However, this process gives a polymerization liquid containing a number of agglomerates since the hydrophobic/hydrophilic balance of the polymerization system is lost owing to polyolefins of the offset prevention agent. Further, since polyolefin is more hydrophobic than styrene-acrylic resin which is a constituent of the toner, the former is localized in the core part of toner particles and scarcely present on the particle surface or in the vicinity thereof, so that offset prevention effect is not satisfactorily exhibited.

SUMMARY OF THE INVENTION

An object of this invention is to provide a process for producing toners which can overcome the above-mentioned difficulties of the prior processes for producing toners intended for improving the defects of grinding processes, which can produce toners for electrophotography suitable for dry development which are excellent in image density, resolution and gradation and, particularly, excellent in cleaning property, charge stability and caking resistance by utilizing a polymerization process, and which eliminates the need of a grinding step.

Another object of this invention is to provide a process for producing toners which can produce toners for electrophotography suitable- for dry development which are excellent in offset resistance.

This invention relates to a process for producing a toner for electrophotography which comprises polymerizing a polymerizable monomer dispersed by emulsification in the presence of a colorant and/or a magnetic powder to prepare a principal resin component, and then effecting the coagulation of the resulting polymerization liquid in such a way that the particles in the liquid after coagulation have diameters suitable for a toner.

DESCRIPTION OF THE PREFERRED EMBODIMENTS

In the process of this invention, the abovementioned coagulation is preferably conducted at a temperature not lower than the glass transition point of the principal resin component.

In the process of this invention, further, the particles are preferably heated at a temperature not lower than the glass transition point of the principal resin component after said coagulation. In this case, it is preferable to heat the above-mentioned polymerization liquid after coagulation.

In the process of this invention, further, it is preferable to add a liquid dispersion of an offset prevention agent to the polymerization liquid during the polymerization when the conversion has reached 90% by weight or more, or after polymerization and before coagulation, or after coagulation.

In the process of this invention, further, the particles after coagulation is preferably washed with warm water.

This invention will be described in more detail below.

In this invention, the polymerization of a polymerizable monomer is conducted by polymerizing the polymerizable monomer dispersed by emulsification in an aqueous medium containing an emulsifier.

In said dispersion by emulsification, a colorant and/or a magnetic powder and a polymerization initiator are made to exist in the medium. In addition thereto, there may be present, if required, one or more toner characteristic improving agents such as offset prevention agents, charge control agents, fluidity improving agents and cleaning property improving agents, stabilizers to help emulsification and dispersion, and chain transfer agents.

The dispersion by emulsification of the polymerizable monomer in the aqueous medium can be conducted either by mixing, with stirring, the polymerizable monomer, the emulsifier, and the aqueous medium simultaneously or by adding the polymerizable monomer to the aqueous medium containing the emulsifier dissolved therein, followed by mixing with stirring.

As polymerization initiators, there can be used an oil soluble polymerization initiator and/or a water soluble one. Preferably-, an oil soluble initiator or a combination of an oil soluble one with an amount of a water soluble one smaller than the weight of the oil soluble one is used as the polymerization initiator.

When a polymerization initiator containing a larger proportion of a water soluble initiator is used, the toner obtained is liable to be hygroscopic and is resultantly liable to give decreased amount of triboelectric charge and to cause fogging of images under high humidity atmosphere.

Though the polymerization initiators may be added after dispersion by emulsification, it is preferable to dissolve, in advance before the dispersion by emulsification, the oil soluble initiator into the polymerizable monomer and the water soluble initiator into the aqueous medium.

The colorants and/or magnetic powders are preferably used after dissolved or dispersed beforehand in the polymerizable monomer rather than being added after the above-mentioned dispersion by emulsification in order to enhance their dispersion into the resin. The same applies to the toner characteristic improving agents and chain transfer agents used as required. Further, stabilizers, which may be used as required, can be either added after the above-mentioned dispersion by emulsification or used after dissolved in the aqueous medium beforehand.

The mixing with stirring in the above-mentioned dispersion may be conducted with stirring at a relatively high speed by using conventional stirrers. However, it is preferably conducted by using emulsifying apparatuses such as high-speed shear dispersing machines, homogenizers, colloid mills, flow jet mixers, ultrasonic emulsifiers and static mixers. The same applies to the case where colorants and/or magnetic powders and toner characteristic improving agent used as required are dispersed into the polymerizable monomer.

Polymerization is preferably conducted, after the above-mentioned dispersion by emulsification or while the dispersion is being effected, at a temperature of 20° to 120° C, particularly at a temperature of 50° to 90° C.

The polymerization is preferably made to proceed until the conversion reaches 99% by weight or more, particularly 99.9% by weight or more. When the conversion is low and the amount of residual monomer is large, the resultant toner tends to have poor characteristics, particularly poor storage stability.

The polymer obtained by the polymerization has preferably a weight average molecular weight of 50,000 or more. When the molecular weight is too small, the resulting toner tends to show poor cleaning property and poor caking resistance.

The polymer obtained has preferably a glass transition point of 30° to 90° C, particularly 50° to 80° C. When the glass transition point is too low, the caking resistance tends to decrease, whereas when it is too high the fixing property tends to be poor. The control of the glass transition point may be mainly effected by proper selection of the polymerizable monomer to be used.

Particles of about 3 μm or less in diameter are obtained by such polymerizations.

The materials used in the polymerization will be explained below.

As the above-mentioned polymerizable monomers, there can be used styrene and derivatives thereof such as o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, n-methoxystyrene, p-phenylstyrene, p-chlorostyrene, and 3,4-dichlorostyrene; ethylenically unsaturated monolefins such as ethylene, propylene, butylene and isobutylene; vinyl halides such as vinyl chloride, vinylidene chloride, vinyl bromide, and vinyl fluoride; vinyl esters such as vinyl acetate, vinyl propionate, vinyl benzoate, and vinyl butyrate; α-methylene aliphatic monocarboxylic acid esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, phenyl acrylate, methyl 2-chloroacrylate, methyl methacrylate, ethyl methacrylate, propyl methacrylate, n-butyl methacrylate, isobutyl methacrylate, n-octylmethacrylate, dodecyl methacrylate, 2-ethylhexyl methacrylate, stearyl methacrylate, phenyl methacrylate, dimethylaminoethyl acrylate, dimethylaminoethyl methacrylate, diethylaminoethyl acrylate, and diethylaminoethyl methacrylate; derivatives of acrylic or methacrylic acid such as acrylonitrile, methacrylonitrile, acrylamide, methacrylamide, 2-hydroxyethyl acrylate, 2-hydroxypropyl acrylate, 2-hydroxyethyl methacrylate, and 2-hydroxypropyl methacrylate; and, as the occasion may demand, also acrylic acid, methacrylic acid, maleic acid and fumaric acid. There can also be used vinyl ethers such as vinyl methyl ether, vinyl ethyl ether, and vinyl isobutyl ether; vinyl ketones such as vinyl methyl ketone, vinyl hexyl ketone, and methyl isopropenyl ketone; N-vinyl compounds such as N-vinylpyrrole, N-vinylcarbazole, N-vinylindole and N-vinylpyrrolidone; and vinylnaphthalene salts etc. These monomers can be used each alone or in combination of two or more thereof. Among these monomers, styrene or derivatives thereof used in a proportion of 40 to 100% by weight give a toner exhibiting an excellent fixing property when the toner is printed on paper in an electrophotocopying apparatus.

There can also be used as a part of the polymerizable monomer of this invention a compound having two or more polymerizable double bonds which serves as a crosslinking agent. For example, there can be used, each alone or in a mixture, aromatic divinyl compounds such as divinylbenzene, divinylnaphthalene, and derivatives thereof; diethylenic carboxylic acid esters such as ethylene glycol dimethacrylate, diethylene glycol dimethoxylate, triethylene glycol diacrylate, and trimethylolpropane triacrylate; divinyl compounds such as N,N-divinylaniline, divinyl ether, and divinyl sulfite; and compounds having three or more vinyl groups. The amount of the crosslinking agent to be used is preferably 0 to 20% by weight, particularly 0 to 5% by weight, based on the total amount of the polymerizable monomers.

Although water is mainly used as the aqueous medium used in dispersion by emulsification, there can also be used, as the occasion may demand, water soluble organic solvents such as methanol, ethanol, methyl Cellosolve, and butyl Cellosolve each in a mixture with water. The amount of the water soluble organic solvent used is preferably 10% by weight or less based on the amount of water. The ratio of the above-mentioned polymerizable monomer to the aqueous medium is preferably 40/60 to 90/10 in terms of the ratio of the latter/-the former by weight. When the ratio is too small the dispersion by emulsification is difficult, whereas when the ratio is too large the yield is decreased.

As emulsifiers, there can be used one or more anionic surface active agents, cationic surface active agents, amphoteric surface active agents and nonionic surface active agents. Among these, anionic surface active agents are preferably used in producing negatively chargeable toners and cationic surface active agents are preferably used in producing positively chargeable toners. In these cases, nonionic surface active agents may also be used together to improve the dispersion stability.

Examples of anionic surface active agents include fatty acid salts such as sodium oleate and potassium castor oil; alkyl sulfuric ester salts such as sodium lauryl sulfate and ammonium lauryl sulfate; alkylbenzenesulfonic acid salts such as sodium dodecylbenzenesulfonate; alkylnaphthalenesulfonic acid salts, dialkylsulfosuccinic acid salts, alkylphosphoric ester salts, naphthalenesulfonic acid-formaldehyde condensation products, and polyoxyethylenealkyl sulfuric ester salts.

Examples of nonionic surface active agents include polyoxyethylene alkyl ether, polyoxyethylene alkylphenol ether, polyoxyethylene fatty acid ester, sorbitan fatty acid ester, polyoxysorbitan fatty acid ester, polyoxyethylenealkylamine, glycerol fatty acid ester, and oxyethylene-oxypropylene block copolymers.

Examples of cationic surface active agents include alkylamine salts such as laurylamine acetate and stearylamine acetate and quaternary ammonium salts such as lauryltrimethylammonium chloride and stearyltrimethylammonium chloride.

Examples of amphoteric surface active agents include lauryltrimethylammonium chloride.

The amount of emulsifiers to be used is preferably 0.01 to 10% by weight, particularly 0.5 to 5% by weight, based on the amount of polymerizable monomers. When the amount of emulsifiers used is too small, stable dispersion by emulsification is difficult, whereas when it is too large the resulting toner has poor moisture resistance.

Examples of stabilizers to be used include water soluble high molecular compounds such as polyvinyl alcohol, starch, methyl cellulose, carboxymethyl cellulose, hydroxyethyl cellulose, sodium polyacrylate, and sodium polymethacrylate. These are preferably used in an amount of 0 to 1% by weight based on the amount of polymerizable monomers.

As oil soluble polymerization initiators, there can be used organic peroxides such as benzoyl peroxide, and t-butyl perbenzoate, and azobis compounds such as azobisisobutyronitrile and azobisisobutylvaleronitrile. As water soluble polymerization initiators, there can be used persulfates such as potassium persulfate and ammonium persulfate; hydrogen peroxide, 4,4'-azobiscyanovaleric acid, 2,2'-azobis(2-amidinopropane) dihydrochloride, t-butyl hydroperoxide and cumene hydroperoxide.

The above mentioned water soluble initiators may also be used in combination with reducing agent(s). The reducing agents which can be used may be commonly known ones including sodium metabisulfite and ferrous chloride. Though the use of the reducing agents is not necessarily needed, they are preferably used in an amount equivalent to water soluble initiators or less in case where they are used.

The polymerization initiator is preferably used in an amount of 0.01 to 10% by weight, particularly 0.1 to 5% by weight, based on the amount of polymerizable monomers.

Examples of chain transfer agents include alkyl mercaptans such as t-dodecyl mercaptan; lower alkyl xanthogens such as diisopropyl xanthogen; carbon tetrachloride, and carbon tetrabromide. They are preferably used in an amount of 0 to 2% by weight based on the amount of polymerizable monomers.

Colorants which can favorably be used in this invention include pigments and dyes. There can be used, for example, various kinds of carbon black, niglosine dye (C.I. No. 50415), aniline blue (C.I. No. 50405), Calco Oil Blue (C.I. No. azoec blue 3), chrome yellow (C.I. No. 14090), ultramarine blue (C.I. No. 77103), DuPont Oil Red (C.I. No. 26105), Orient Oil Red (C.I. No. 60505), quinoline yellow (C.I. No. 47005), methylene blue chloride (C.I. No. 52015), phthalocyanine blue (C.I. No. 74160), malachite green oxalate (C.I. No. 42000), lamp black (C.I. No. 77266), Rose Bengal (C.I. No. 45435), Oil Black and Azo Oil Black each alone or as a mixture thereof. Though these colorants may be used in any desired amount, they are preferably used, for obtaining necessary color density and for economic reasons, in an amount to give a content thereof in the toner from about 1 to 30% by weight, more particularly from 5 to 15% by weight.

The pigments and dyes used may be those which have been subjected to various treatments to improve their dispersibility into the polymerization system or into the toner of this invention. Examples of the above-mentioned treatments include that of niglosine dye (C.I. No. 50415) using organic acids such as stearic acid and maleic acid.

Among these colorants, particularly preferable for toners of this invention are various kinds of carbon blacks such as furnace black, channel black, thermal black, acetylene black and lamp black. Further, the above-mentioned carbon black may be used after subjected to a surface treatment. The surface treatment includes, for example, oxidation treatment using various oxidizing agents such as oxygen, ozone and nitric acid; and surface adsorption treatment using organic acid esters such as dibutyl phthalate and dioctyl phthalate.

When carbon black is used as a colorant, it is preferable to use a grafted carbon black. Grafted carbon black is a product obtained by polymerizing the above-mentioned polymerizable monomer in the presence of carbon black by means of mass polymerization, solution polymerization and the like. The content of polymer component in grafted carbon black is preferably 50% by weight or less, particularly 30% by weight or less, based on the weight of the grafted carbon black. Though grafted carbon black is advantageous because of its excellent dispersion stability-in dispersion by emulsification, a carbon black containing too much polymer component tends to give too high a viscosity and resultantly poor processability when dispersed in a polymerizable monomer. The amount of grafted carbon black to be used is preferably determined depending on the amount of carbon black component therein.

The magnetic powder is used in producing magnetic toners. It can serve also as a colorant. Preferable magnetic powders include those of oxides or compounds of elements exhibiting ferromagnetism such as iron, nickel and cobalt, for example magnetite or ferrite. It is preferable to use magnetic powders in powder form having a particle diameter of 0.01 to 3 μm. The surface of magnetic powders may be treated with one or more resins, titanium coupling agents, silane coupling agents or metal salts of higher fatty acids. These magnetic materials can be contained in an amount of 20 to 80% by weight, preferably 35 to 70% by weight, based on the weight of the toner. They may also be used as a colorant in an amount less than that mentioned above.

The offset prevention agent is used depending on necessity. The offset prevention agent can be present in the polymerization system in various forms at the time of polymerization to be included in the final product of toner. Alternatively, the offset prevention agent can be added afterwards to a toner of this invention containing no offset prevention agent. Examples of the offset prevention agent usable in this invention include various natural waxes, such as carnauba wax and hardened castor oil, and low molecular weight olefin polymers. The use of low molecular weight olefin polymers is preferable. As the low molecular weight olefin polymers, there can be used polymers of olefins or copolymer of an olefin and a monomer other than olefin, these polymers and copolymers having a low molecular weight. Examples of olefins include ethylene, propylene, and butene-1. Examples of the monomer other than olefin include acrylic esters and methacrylic esters. As the low molecular weight olefin polymer, there can be used, for example, a polyalkylene disclosed in Japanese patent appln Kokai (Laid-Open) No. 153944/80 and a low molecular weight olefin copolymer disclosed in Japanese patent appln Kokai (Laid-Open) No. 93647/75.

The molecular weight of the low molecular weight olefin polymer used in this invention will suffice so long as it is within a general concept of low molecular weight in the field of common high molecular compounds. Generally speaking, the molecular weight is 1,000 to 45,000, preferably 2,000 to 6,000, in terms of weight average molecular weight (Mw).

The low molecular weight olefin polymer used in this invention has preferably a softening point of 100° to 180° C., particularly 130° to 160° C.

There is no particular limitation as to the amount of low molecular weight olefin polymer usable in this invention, but an amount of 0 to 30% by weight, particularly 1 to 30% by weight, based on the weight of the toner is preferable. When the amount of low molecular weight olefin polymer is too small the offset prevention effect of the addition thereof is not exhibited, whereas when it exceeds 30% by weight gelation can take place during polymerization.

Further, a fluidity improving agent, a cleaning property improving agent and the like can be used depending on necessity. These agents can be added to the polymerization reaction system so as to be included in the final product of the toner, but are preferably added to the product toner afterward by addition treatments. These agents are preferably contained in amounts of 0 to 3% by weight, respectively, based on the weight of the toner of this invention.

Examples of the fluidity improving agent are silanes, titanium, aluminum, calcium, magnesium, magnesium oxide, and a product obtained by subjecting the above-mentioned oxide to a hydrophobic treatment with a titanium coupling agent or a silane coupling agent.

Examples of the cleaning property improving agent are metal salts of higher fatty acids such as zinc stearate, lithium stearate, and magnesium laurate, and aromatic acid esters such as pentaerythritol benzoate.

In this invention, the charge amount and the charge polarity of the product toner can be controlled freely by properly selecting the polymerizable monomer and the colorants. In order t-o adjust the charge amount and the charge polarity to more desirable values, a charge control agent can be added to the toner of this invention together with a colorant.

Examples of the charge control agent favorably used in this invention include azodyes such as Supiron Black TRH and Supiron Black TPH (trade names, mfd. by Hodogaya Chemical Co., Ltd.), aromatic acid derivatives such as p-fluorobenzoic acid, p-nitrobenzoic acid, and 2,4-di-t-butylsalicylic acid, and tin compounds such as dibutyl tin oxide and dioctyl tin oxide. These agents are preferably used in an amount of 0 to 5% by weight based on the amount of polymerizable monomers.

In this invention, after the principal resin component has been produced by polymerization, a coagulating agent is added to the resulting polymerization liquid (particle dispersion liquid) to effect coagulation of the particles. By coagulating properly the particles in the said polymerization liquid by the above procedure, a resin suitable for toners can be obtained which has an average particle diameter larger than that of particles in the above polymerization liquid, is imperfectly spherical in shape, and needs no grinding.

It is preferable to adjust the particle diameter distribution of the coagulated particles to a range of 1 to 100 μm, particularly 3 to 70 μm. It is most preferable to adjust it such that the main portion of the particles may have diameters of 5 to 25 μm. The average particle diameter is preferably adjusted to 9 to 15 μm. In order to effect such adjustment, the coagulating agent is preferably used in an amount of 0.1 to 5 times, more preferably 0.3 to 3 times, the weight of the emulsifier in the polymerization liquid. Too small amount of the coagulating agent gives insufficient agglomeration effect, whereas too large amount thereof results in deterioration of moisture resistance of the product toner and, at the same time, too large in average diameter of coagulated particles.

Since the coagulation step gives toner particles imperfectly spherical in shape, toner particles excellent in cleaning property can be obtained. Further, since the emulsifiers are also removed by the coagulation, blocking resistance and charge stability of the toner are also improved.

Mixing of the polymerization liquid with the coagulating agent in the above coagulation step can be conducted by such a method as adding the polymerization liquid dropwise and gradually to an aqueous solution of the coagulating agent with stirring or mixing the aqueous solution of the coagulating agent and the polymerization liquid continuously in a fixed ratio.

In the coagulation step, there is no particular limitation as to the temperature. However, the coagulation is preferably conducted at a temperature from room temperature to 150° C., particularly preferably at a temperature not lower than the glass transition point of the principal resin component. When coagulation is conducted at a temperature lower than the glass transition point, it is preferable to heat thereafter the particles after coagulation to a temperature not lower than the glass transition point of the polymer. In this case, it is preferable to heat the polymerization liquid after coagulation (i.e. coagulated liquid).

The bulk density of the particles is increased and the moisture resistance and the durability are improved by the above heat treatment. Particularly the durability is improved most.

The upper limit of the heat treatment temperature is preferably 150° C.. When the treatment temperature is too high, the principal resin component is liable to be degraded and, moreover, complicated heating equipment becomes necessary.

A temperature 25° to 60° C. higher than the glass transition point of the principal resin component is most preferred as the heat treatment temperature.

The heat treatment at the time of coagulation can be conducted by heating the mixture formed by the above-mentioned procedure.

When the heat treatment is conducted after coagulation, the temperature during the coagulation is not limited specifically. This heat treatment can be conducted either by heating successively the coagulated liquid after the coagulation or by first separating the particles from liquid and, optionally after intervening step of washing or grinding, dispersing the particles into an aqueous medium followed by heating. Further, both the heat treatment at the time of coagulation and the heat treatment after coagulation may be conducted together as the occasion demands.

In the coagulation step, there is conceivable another method wherein a large amount of the coagulating agent is added to the polymerization liquid to give a large-sized coagulated product, and the product is then ground to give particles having a diameter suitable for a toner. Although this method provides an effect that the additives are more uniformly dispersed in the resin than in toners obtained by the grinding process, the toners thus obtained assume a shape more alike to toners obtained by the grinding process and consequently are poorer in cleaning property and toner fluidity than those obtained according to this invention.

In contrast, according to the process of this invention, the particles obtained by coagulation can be made, as they are or after mere classification, into toners. Further, the shape of the toner particles is different from that of the toner obtained by the grinding process, which is asymmetric and utterly different from spheres, and, at the same time, is not perfect sphere but imperfect sphere. Consequently, the toner of this invention is excellent in cleaning property.

Examples of the coagulating agent include inorganic acids such as hydrochloric acid and sulfuric acid; organic acids such as formic acid and oxalic acid; and water soluble metal salts formed from these acids and alkaline earth metals, aluminum etc. These coagulating agents can be used alone or as a mixture thereof. Preferred coagulating agents are magnesium sulfate, aluminum sulfate, barium chloride, magnesium chloride, calcium chloride, sodium chloride and/or combinations thereof with inorganic acids. These coagulating agents are preferably used as a 0.1 to 10% by weight aqueous solution, more preferably as a 0.1 to 5% by weight aqueous solution.

After coagulation, the resulting product is subjected to centrifugation to remove water and further subjected to steps of washing, drying and, if necessary, classification to obtain toner particles.

The above-mentioned washing is favorable for completely removing the emulsifier adhered to the particles and thus, together with the above-mentioned coagulation, can improve charge stability and caking resistance. The washing is preferably conducted with warm water at 40° to 100° C., more preferably at 40° to 60° C.

The above-mentioned heat treatment after coagulation may be conducted during the washing step or interposed between two or more steps of washing.

In the process of this invention, the liquid dispersion of the offset prevention agent is preferably added (a) into the polymerization liquid, during polymerization, at the time when the conversion has reached 90% by weight or more; (b) to the polymerization liquid after completion of polymerization and before coagulation; and/or (c) after the polymerization liquid after completion of polymerization has been coagulated. The liquid dispersion of the offset prevention agent is added in at least one of the above-mentioned steps (a), (b) and (c). It may also be added in plural times.

When the liquid dispersion of the offset prevention agent is added after the conversion in polymerization reached 90% by weight but before the coagulation after completion of polymerization, the offset prevention agent is not present in the core part of the polymer particles at the completion of polymerization but present in particles obtained by coagulation of polymer particles, existing among said polymer particles and on the surfaces of particles obtained by coagulation. When the liquid dispersion of the offset prevention agent is added after completion of polymerization, the offset prevention agent adheres to the surfaces of particles obtained by coagulation.

On the other hand, when the liquid dispersion of the offset prevention agent is added before the conversion in polymerization reaches 90% by weight, particularly at the time of initiation of the polymerization, the offset prevention agent comes to exist in the core part of polymer particles at the completion of polymerization. Consequently, the particles obtained by coagulation of such particles show only a small offset prevention effect when used as a toner.

When the offset prevention agent is added after completion of polymerization, the addition is preferably conducted before the above-mentioned heat treatment operation. This is because the offset prevention agent adheres more easily and sufficiently to the particle surface when the addition is conducted before the heat treatment operation than conducted after the operation.

In this invention, the liquid dispersion of the offset prevention agent is a liquid of a state wherein the agent is dispersed in a fine particle form in the continuous phase of water.

The offset prevention agents used herein are those which have an offset prevention effect and, at the same time, are dispersible in water. For example, various kinds of natural waxes, such as carnauba wax and hardened castor oil, and low molecular weight olefin polymers can be used in this invention. Low molecular weight olefin polymers are preferably used. As the low molecular weight olefin polymers, there can be used those described before.

Preferably, the offset prevention agent in the above-mentioned liquid dispersion has an average particle diameter of 5 μm or less and contains no particle larger than 20 μm in diameter. When the particle diameter is too large, those particles are liable to be formed in the toner obtained according to this invention which contain no offset prevention agent.

In the above-mentioned liquid dispersion, the ratio of the offset prevention agent to water is preferably 5/5 to 9/1 in terms of the former / the latter by weight. When the ratio is too small the stability of the liquid dispersion is decreased, whereas when it is too large the efficiency of the treatment is decreased.

There is no particular limitation as to the method for preparing the liquid dispersion mentioned above. There can be used, for example, a method to disperse the offset prevention agent in the form of solid or liquid into water by means of such machines as homomixer, homogenizer, disperser, and ultrasonic dispersing machine or a method to disperse and polymerize a polymerizable monomer in water. In the former method of dispersion, a surface active agent including anionic or nonionic one can be additionally used to improve the stability of the liquid dispersion and to obtain more minute particles. Though the kind and amount of the surface active agent vary depending on the kind of the offset prevention agent to be dispersed, the amount is preferably 10% by weight or less based on the offset prevention agent. Too much amount of the surface active agent makes the toner obtained hygroscopic and affects adversely on storage stability and charge characteristics because a large quantity of the surface active agent will remain in the toner. When the resin to be dispersed is solid at room temperature, it is preferable to heat it above the glass transition point of the resin or to plasticize it by adding a small amount of an organic solvent thereto.

On the other hand, the latter method of utilizing polymerization can be conducted by emulsion polymerization or suspension polymerization. Emulsion polymerization method is preferred since it gives finer particles. The emulsion polymerization method comprises polymerizing a polymerizable monomer dispersed by emulsification into an aqueous medium containing an emulsifier. The amount of the emulsifier used herein is preferably 10% by weight or less based on the weight of the offset prevention agent, as in the case of the surface active agent described above. The advance effects exerted when the amount of the emulsifier is too large are similar to those in the case of the surface active agent described above.

There is no particular limitation as to the amount of the liquid dispersion of the offset prevention agent to be added in the process of this invention. However, it is preferably selected so as to give a content of 0.1 to 30% by weight of the offset prevention agent in the toner. When the content is less than 0.1% by weight, the offset prevention effect is not manifested. When it exceeds 30% by weight, the qualities of the image obtained including image density tend to be poor. The above-mentioned amount of the liquid dispersion to be added is selected based on a quantity determined from the weight of polymer particles obtained by polymerization or particles obtained by coagulation and the amount of the offset prevention agent to be included so as to give a content of the offset prevention agent in the above-mentioned range.

The toner obtained according to this invention can be used in various developing processes such as the cascade developing method disclosed in U.S. Pat. No. 2,618,552, the magnetic brush method disclosed in U.S. Pat. No. 2,874,065, the powder cloud method disclosed in U.S. Pat. No. 2,221,776, the touchdown developing method disclosed in U.S. Pat. No. 3,166,432, the so-called jumping method disclosed in Japanese Patent Appln Kokai (Laid-Open) No. 18656/80, the so-called microtoning method using a magnetic toner produced by a grinding process as a carrier, and the so-called bipolar magnetic toner method wherein necessary toner charge is obtained by triboelectric charge of magnetic toners each other.

various fixing methods such as the so-called oilless and oil coating heat roll method, the flash method, the oven method, and the pressure fixing method can be applied to the toner obtained according to this invention.

Further, various cleaning methods such as the so-called fur brush method and the blade method can be applied to the toner of this invention.

According to this invention, there can be obtained by utilizing a polymerization process a toner for electrophotography suitable for dry development which is excellent in image density, resolution and gradation and, at the same time, excellent in cleaning property, charge stability and caking resistance.

Further, the said toner can be made more excellent in durability by subjecting it to a heat treatment during coagulation or after coagulation.

Further, the said toner can be made to have extremely excellent offset resistance in the fixing process using a heat roll method by subjecting it to a mixing treatment with an offset prevention agent as mentioned above.

In Examples and Comparative Examples described below, the electrophotographic characteristics were evaluated as follows.

(a) Resolution

Test Chart No. 1 available from the Society of Electrophotography of Japan was used to produce copies on plain paper by using a developer prepared respectively. The resolution was evaluated by examining how far the details of the copied image can be discerned.

(b) Image density

After producing copies in the same manner as in the resolution above, the density of the black portion on the paper was measured with a densitometer to judge image density.

(c) Gradient

After producing copies in the same manner as in the resolution, the gradient was evaluated by using the high and low density portions divided into 11 steps in the central part of the test chart.

(d) Cleaning property

A developer prepared respectively were used in a copying machine to produce copies continuously under conditions of a temperature of 30° C. and a humidity of 80% RH. The cleaning property was evaluated by the number of copies obtainable until a defective cleaning takes place.

(e) Caking resistance

A toner prepared respectively was allowed to stand at 50° C. and under a humidity of 95% RH for 72 hours to judge whether blocking of the toner occurred or not. The results of evaluation were indicated by the following symbols.

○: Excellent
×: Poor (f) Charge stability

A developer prepared respectively was stirred in a copying machine to determine the amount of electric charge at predetermined intervals. The charge stability was evaluated by the change of the amount of charge and the results were indicated by the following symbols.

○: Excellent
×: Poor (g) Durability

A developer prepared respectively was used in a copying machine to produce 10,000 copies continuously under conditions of a temperature of 30° C. and a humidity of 80% RH. The scattering of the toner occurring during the time was examined. The durability was evaluated and indicated as follows.

⊙: No scattering of toner is observed.
○: Some scattering of toner is observed.
Δ: Much scattering of toner is observed.
×: A large amount of toner is scattered.

(h) Moisture absorption

A toner prepared respectively was allowed to stand under conditions of 25° C. and a humidity of 98% RH for 24 hours. The ratio of the increase of weight after humidification to the weight before humidification was regarded as the moisture absorption and expressed in percent.

(i) Offset resistance

A copying machine for plain paper (U-Bix 1600, a trade name, mfd. by Konishiroku Photo Industry Co., Ltd.) from which the fixing part had teen removed was used to obtain an unfixed toner image. Then, the image was fixed by using a fixing test apparatus composed of an upper, Teflon coated roll and a lower, silicone rubber coated roll, the temperature of the upper roll being variable, at a linear velocity of 70 mm/second and a pressure between the rolls of 0.5 kgf/cm. The results of evaluation were indicated by the symbol ○ offset occurred and X when no offset occurred.

This invention is illustrated by way of the following Examples, in which % means % by weight.

EXAMPLE 1

(1) Production of emulsion polymerization liquid

In a 3-liter stainless steel beaker, 100 g of grafted carbon (Graft Carbon GP-E-2, a trade name, mfd. by Ryoyu Kogyo Kabushiki Kaisha), 400 g of styrene and 120 g of butyl acrylate as polymerizable monomers, and 0.6 g of t-dodecyl mercaptan as a chain transfer agent were mixed and dispersed by using a Homomixer at 3000 r.p.m. for 30 minutes.

To the liquid dispersion of carbon thus obtained, was added then an aqueous solution prepared by dissolving into 1300 g of deionized water, 12 g of sodium dodecylbenzenesulfonate, an anionic surface active agent, 3 g of Nonipole PE-68 (a trade name of an oxypropyleneoxyethylene block copolymer, mfd. by Sanyo Chemical Industries, Ltd.) and 3 g of Noigen EA 170 (a trade name of a polyoxyethylene glycol nonylphenyl ether, mfd. by Dai-ichi Kogyo Seiyaku Co., Ltd.), both a nonionic surface active agent, each as an emulsifier, and 12 g of ammonium persulfate as a polymerization initiator. The mixture was further emulsified for 30 minutes by means of a Homomixer at 3000 r.p.m. to obtain a black pre-emulsion.

Then, the black pre-emulsion was transferred to a 3-liter, four-necked separable flask equipped with a stirrer, a nitrogen inlet, a thermometer and a condenser. The pre-emulsion was polymerized under nitrogen gas stream for 5 hours while keeping the temperature in the flask at 70° C., and then cooled to obtain an emulsion polymerization liquid. The conversion was 99.5% or higher. The molecular weight of the polymer obtained was determined by gel chromatography using a calibration curve obtained with standard polystyrene. The weight average molecular weight (Mw) was 86,000 and the number average molecular weight (Mn) was 30,000.

(2) Coagulation Step and Final Step

One liter of the emulsion polymerization liquid obtained above was uniformly added dropwise over a period of about 30 minutes into 2 liters of 1% aqueous $MgSO_4$ solution heated at 30° C. with thorough stirring while keeping the temperature of the aqueous solution at 30° C. to effect coagulation. Then, the resulting slurry was kept at the same temperature for 30 minutes and then cooled to room temperature. The slurry was then dehydrated by means of a centrifugal dehydrator. The resulting cake was washed three times with warm water at 50° C. and then dried in a drier at 30° to 35° C. to yield a toner. The particle diameter of the toner obtained was determined with a Coulter counter. The particle diameter was 1 to 50 μm and the average particle diameter was 13 μm. The glass transition point (Tg) determined with a differential scanning colorimeter was found to be 73° C. The toner was classified to particles of 5 to 25 μm diameter by means of a zigzag classifier (100MZR, a trade name, mfd. by Alpine Corp.) to give a yield of 90% based on the weight before classification.

Also in the following Examples and Comparative Examples, the particle diameter and the average particle diameter were determined with the Coulter counter, the glass transition point was determined with the differential scanning calorimeter, and the classification was conducted with the zigzag classifier.

EXAMPLES 2 TO 6

One liter of the emulsion polymerization liquid obtained in Example 1 was uniformly added dropwise over a period of about 30 minutes into an aqueous solution of a coagulating agent (indicated in Table 1) heated at a coagulation temperature indicated in Table 1 to effect coagulation. The coagulation mixture was maintained at the above-mention coagulation temperature during the coagulation. Then, after completion of the dropwise addition of the emulsion polymerization liquid, the mixture was further kept at the same temperature as the above-mentioned coagulation temperature for 30 minutes, and then cooled to room temperature. The resulting coagulated liquid (slurry) was dehydrated with a centrifugal dehydrator, washed three times with warm water at 50° C. and then dried in a drier at 30 to 35° C. to yield toner particles.

The particle diameter, the average particle diameter, the yield of particles 5 to 25 μm in diameter, and the glass transition point of the principal resin component of the toner are shown in Table 1 together with the results obtained in Example 1.

The toners obtained after classification in Examples 1 to 6 were examined for their electrophotographic toner characteristics by using a copying machine for plain paper (U-Bix 1600, a trade name, mfd. by Konishiroku Photo Industry Co., Ltd.) using a commercially available nonconducting carrier. Each of the toners was subjected beforehand to addition treatment with 0.6% and 0.1%, based on the weight of the toner, of a hydrophobic silica (R-972, a trade name, mfd. by Nippon Aerosil Co.) and zinc stearate, respectively, as fluidity improving agents. The results of the tests are shown in Table 1.

TABLE 1

| | Example No. | | | | | |
|---|---|---|---|---|---|---|
| | 1 | 2 | 3 | 4 | 5 | 6 |
| Coagulating agent solution | 1% $MgSO_4$ 2 l | 0.5% $MgSO_4$ 2 l | 0.3% $MgSO_4$ 2 l | 0.3% $MgSO_4$ 2 l | 2% $CaCl_2$ 1 l | 2% $Al_2Cl_3$ 1 l |
| Coagulating agent/Emulsifier (wt. ratio) | 2.2/1 | 1.1/1 | 0.7/1 | 0.7/1 | 2.2/1 | 2.2/1 |
| Coagulation temperature (°C.) | 30 | 70 | 100 | 120 | 100 | 100 |
| Toner particle diameter (μm) | 1-50 | 1-40 | 3-80 | 5-100 | 1-100 | 1-100 |
| Toner average particle diameter (μm) | 13 | 10 | 18 | 20 | 18 | 20 |
| Yield of 5-25 μm particle (%) | 90 | 95 | 75 | 50 | 60 | 50 |
| Tg of principal resin component (°C.) | 73 | 73 | 73 | 73 | 73 | 73 |
| Resolution (lines/inch) | 5.0 | 5.0 | 4.0 | 5.0 | 5.0 | 4.0 |
| Image density | 1.2 | 1.1 | 1.2 | 1.2 | 1.2 | 1.2 |
| Gradient | 6 | 6 | 6 | 6 | 7 | 6 |
| Cleaning property (number of sheets) | 11,000 | 10,500 | 10,000 | ≧12,000 | 10,000 | 11,000 |
| Resistance to blocking | ○ | ○ | ○ | ○ | ○ | ○ |
| Charge stability | Δ | Δ | ○ | ○ | ○ | ○ |
| Durability | X | Δ | ○ | ○ | ○ | ○ |
| Moisture resistance (%) | 3.1 | 2.5 | 0.9 | 1.1 | 0.95 | 1.0 |

EXAMPLES 7 TO 9

Coagulation was conducted in the same manner as in Examples 1 to 6 by using 1 liter of the emulsion polymerization liquid obtained in Example 1 and an aqueous solution of a coagulating agent (indicated in Table 2) heated at a coagulation temperature indicated in Table 2. The coagulated liquid (slurry) thus obtained was transferred into an autoclave and heated for 30 minutes at a heat treatment temperature indicated in Table 2. Then, the slurry was cooled and dehydrated, washed with water and dried in the same manner as in Examples 1 to 6 to obtain a toner.

The particle diameter, the average particle diameter, the yield of particles 5 to 25 μm in diameter, and the electrophotographic characteristics, tested in the same manner as in Examples 1 to 6, of the obtained toner are shown in Table 2.

TABLE 2

| | Example No. | | |
|---|---|---|---|
| | 7 | 8 | 9 |
| Coagulating agent solution | 1% $MgSO_4$ 2 l | 1% $MgSO_4$ 2 l | 0.5% $MgSO_4$ 2 l |
| Coagulating agent/Emulsifier | 2.2/1 | 2.2/1 | 1.1/1 |

TABLE 2-continued

| | Example No. | | |
|---|---|---|---|
| | 7 | 8 | 9 |
| (wt. ratio) | | | |
| Coagulation temperature (°C.) | 30° C. | 30° C. | 60° C. |
| Heat treatment temperature (°C.) | 110° C. | 140° C. | 120° C. |
| Toner particle diameter (μm) | 1–50 | 1–50 | 1–40 |
| Toner average particle diameter (μm) | 13 | 13 | 10 |
| Yield of 5–25 μm particle (%) | 87 | 85 | 93 |
| Tg of principal resin component (°C.) | 73 | 73 | 73 |
| Resolution (lines/inch) | 5.0 | 5.0 | 5.0 |
| Image density | 1.3 | 1.3 | 1.3 |
| Gradient | 7 | 7 | 7 |
| Cleaning property | ≧12,000 | ≧12,000 | ≧12,000 |
| (number of sheets) | ◎ | ◎ | ◎ |
| Caking resistance | ◎ | ◎ | ◎ |
| Charge stability | ○ | ◎ | ◎ |
| Moisture resistance | 1.2 | 0.67 | 0.95 |

EXAMPLE 10

(1) Production Step of Emulsion Polymerization Liquid

One hundred grams of grafted carbon, 360 g of styrene, 180 g of butyl methacrylate, 6 g of methacrylic acid, 0.6 g of t-dodecyl mercaptan, and 6 g of a low molecular weight polypropylene (Viscole 660 P, a trade name, mfd. by Sanyo Chemical Industries, Ltd.) were mixed together with a Homomixer at 3000 r.p.m. for 30 minutes to form a dispersion.

Then, an aqueous solution prepared by dissolving into 1500 g of deionized water 18 g of sodium dodecylbenzenesulfonate, 4 g of a nonionic surface active agent, Nonipole PE-68 (a trade name, mfd. by Sanyo Chemical Industries, Ltd.), 4 g of another nonionic surface active agent, Noigen EA 170 (a trade name, mfd. by Dai-ichi Kogyo Seiyaku Co., Ltd.), 9 g of ammonium persulfate and 3 g of hydrogen peroxide was introduced into the Homomixer, and the whole was emulsified at 3000 r.p.m. for 30 minutes at room temperature to obtain a black pre-emulsion.

The black pre-emulsion was transferred to a 3-liter, four-necked separable flask, polymerized under a nitrogen gas stream for 5 hours at room temperature, and then cooled to obtain an emulsion polymerization liquid.

The conversion was 99.5% or higher. The molecular weight of the polymer was determined in the same manner as in Example 1. The Mw was 105,000 and the Mn was 41,000.

(2) Coagulation Step and Final Step

The procedures in Examples 1 to 6 were repeated except for using an aqueous solution of a coagulating agent and a coagulation temperature indicated in Table 3 to obtain toner particles.

EXAMPLE 11

The coagulation step and the final step were conducted in the same manner as in Examples 7 to 9 except for using 1 liter of the emulsion polymerization liquid obtained in Example 10 and an aqueous solution of a coagulating agent, a coagulation temperature, and a heat treatment temperature indicated in Table 3 to obtain a toner.

The particle diameter, the average particle diameter, the yield of particles 5 to 25 μm in diameter, the glass transition point of the principal resin component, and the electrophotographic characteristics, tested in the same manner as in Examples 1 to 6, of the toners obtained in Examples 10 and 11 are shown in Table 3.

TABLE 3

| | Example No. | |
|---|---|---|
| | 10 | 11 |
| Coagulating agent solution | 0.5% $MgSO_4$ 1 l | 0.5% $MgSO_4$ 1 l |
| Coagulating agent/Emulsifier (wt. ratio) | 0.4/1 | 0.4/1 |
| Coagulation temperature (°C.) | 100 | 60 |
| Heat treatment temperature (°C.) | — | 120 |
| Toner particle diameter (μm) | 5–70 | 3–40 |
| Toner average particle diameter (μm) | 15 | 11 |
| Yield of 5–25 μm particle (%) | 91 | 63 |
| Tg of principal resin component (°C.) | 76 | 76 |
| Resolution (lines/inch) | 5.0 | 5.0 |
| Image density | 1.1 | 1.3 |
| Gradient | 6 | 7 |
| Cleaning property (number of sheets) | 10,000 | ≧12,000 |
| Caking resistance | ○ | ◎ |
| Charge stability | ○ | ◎ |
| Durability | ○ | ◎ |
| Moisture resistance | 1.21 | 0.79 |

EXAMPLE 12

(1) Production Step of Emulsion Polymerization Liquid.

An emulsion polymerization liquid was obtained in the same manner as in Example 10 except that 30 g of carbon black (Carbon black #44, a trade name, mfd. by Mitsubishi Chemical Industries, Ltd.) was used in place of 100 g of grafted carbon, the quantity of styrene was altered to 414 g, and both low molecular weight polypropylene and hydrogen peroxide were omitted.

The conversion was 99.5% or higher. The Mw and the Mn of the polymer were 90,000 and 29,000, respectively.

(2) Coagulation Step and Final Step

A toner was obtained in the same manner as in Examples 1 to 6 except for using 1 liter of the emulsion polymerization liquid obtained in (1) above and an aqueous solution of a coagulating agent and a coagulation temperature indicated in Table 4.

EXAMPLES 13 AND 14

Toners were obtained in the same manner as in Examples 7 to 9 except for using 1 liter of the emulsion polymerization liquid obtained in Example 12, and an aqueous solution of the coagulating agent, a coagulation temperature, and a heat treatment temperature indicated in Table 4.

The particle diameter, the average particle diameter, the yield of particles 5 to 25 μm in diameter, the glass transition point of the principal resin component, and the electrophotographic characteristics, determined in the same manner as in Examples 1 to 6, of the toners obtained in Examples 12 to 14 are shown in Table 4.

TABLE 4

| | Example No. | | |
|---|---|---|---|
| | 12 | 13 | 14 |
| Coagulating agent solution | 0.5% $MgSO_4$ 1 l | 0.5% $MgSO_4$ 1 l | 0.5% $MgSO_4$ 1 l Made to pH 2 with $H_2SO_4$ |
| Coagulation agent/ Emulsifier (wt. ratio) | 0.4/1 | 0.4/1 | 0.4/1 |
| Coagulation temperature (°C.) | 100 | 60 | 60 |
| Heat treatment temperature (°C.) | — | 120 | 130 |
| Toner particle diameter (μm) | 5–90 | 2–50 | 2–40 |
| Toner average particle diameter (μm) | 18 | 13 | 12 |
| Yield of 5–25 μm particle (%) | 63 | 84 | 91 |
| Tg of principal resin component (°C.) | 76 | 76 | 76 |
| Resolution (lines/inch) | 5.0 | 5.0 | 5.0 |
| Image density | 1.2 | 1.2 | 1.2 |
| Gradient | 6 | 6 | 8 |
| Cleaning property (number of sheets) | 10,500 | 11,000 | ≧12,000 |
| Caking resistance | ○ | ◎ | ◎ |
| Charge stability | ○ | ◎ | ◎ |
| Durability | ○ | ◎ | ◎ |
| Moisture resistance | 1.25 | 0.89 | 0.65 |

EXAMPLE 15

One liter of the emulsion polymerization liquid obtained in Example 10 was added dropwise to 1 liter of 6% aqueous $MgSO_4$ solution with stirring at room temperature to effect coagulation. The weight ratio of the emuslifier to the coagulating agent was 1/6.6. To the coagulated liquid was added 10 to 1% aqueous polyvinly alcohol solution as a stabilizer, and the mixture was heat-treated at 100° C. for 30 minutes and then cooled to room temperature. The diameter of particles in the coagulated liquid was then 100 to 500 μm. Thereafter, the coagulated liquid was dehydrated with a centrifugal dehydrator, washed three times with warm water at 50° C. and dried in a drier at 40° C. The particles obtained were pulverized by means of a jet mill so as to give an average particle diameter of 10 μm, and then classified by means of a classifier to give particles 5 to 25 μm in diameter.

The glass transition point of the principal resin component of the toner thus obtained was 76° C. The toner was examined for the electrophotographic characteristics in the same manner as in Examples 1 to 6. The results were as follows:

| | |
|---|---|
| Resolution (line/inch) | 4.0 |
| Image density | 1.1 |
| Gradient | 6 |
| Moisture resistance (%) | 1.5 |
| Durability | ○ |

COMPARATIVE EXAMPLE 1

(Production of Toner by Suspension Polymerization)

A mixture of 70 g of styrene, 30 g of butyl methacrylate, 15 g of grafted carbon, and 2 g of benzoyl peroxide was kneaded thoroughly in a Homomixer. Then, 500 g of 1% aqueous tricalcium phosphate solution was added thereto and the whole was dispersed further by means of the Homomixer at 3000 r.p.m. for 30 minutes.

The resulting liquid dispersion was transferred to a flask and polymerized in suspension at 80° C. for 7 hours. The conversion was 99% or higher. The resulting polymer was dehydrated, washed with aqueous hydrogen chloride of pH 2 or lower, and then dried to obtain a toner. The resin of the toner had a Mw of 110,000 and a Mn of 50,000.

COMPARATIVE EXAMPLE 2

(Production of Toner by Emulsion Polymerization Followed by Spray Drying)

The emulsion polymerization liquid obtained in Example 1 was spray-dried at a temperature of 110° C. to obtain a toner.

COMPARATIVE EXAMPLE 3

(Grinding Process)

A polymer having a composition of styrene/butyl methacrylate=70/30 (weight ratio), Mw of 70,000 and Mn of 30,000 was prepared by solution polymerization using toluene as the solvent. Toluene was removed from the polymer solution under reduced pressure to obtain a white solid polymer.

A mixture of 1,000 g of the polymer obtained above, 50 g of carbon black, 10 g of copper phthalocyanine, and 20 g of a low molecular weight polypropylene (Viscole 550 P, a trade name, mfd. by Sanyo Chemical Industries, Ltd.) was kneaded with a two-roll mill and then pulverized with a jet mill to obtain a toner.

The particle diameter, the average particle diameter, the yield of particles 5 to 25 μm in diameter, the glass transition point of the principal resin component and the electrophotographic characteristics, tested in the same manner as in Examples 1 to 6, of toners obtained in Comparative Examples 1 to 3 are shown in Table 5.

TABLE 5

| | Comparative Example No. | | |
|---|---|---|---|
| | 1 | 2 | 3 |
| Toner particle diameter (μm) | 5–200 | 1–20 | — |
| Toner average particle diameter (μm) | 20 | 9 | — |
| Yield of 5–25 μm particle (%) | 20 | — | — |
| Tg of principal resin component (°C.) | 71 | 71 | 73 |
| Resolution (lines/inch) | 3.2 | 4.0 | 4.0 |
| Image density | 0.9 | 1.0 | 1.0 |
| Gradient | 5 | 5 | 6 |
| Cleaning property (number of sheets) | 7,000 | 6,000 | 7,000 |
| Caking resistance | Δ | X | Δ |
| Charge stability | X | X | ○ |

The toners obtained in Examples 1 to 14 and Comparative Examples 1 to 3 were examined for the resolution, image density and gradient in the same manner as in the test of electrophotographic characteristics described above by using a copying machine for plain paper (NC-3000, a trade name, mfd. by Copyer Co., Ltd.) using an electroconductive carrier. The results are shown in Table 6.

TABLE 6

| | Characteristics | | | | | | | | | | | | | | | | |
|---|---|---|---|---|---|---|---|---|---|---|---|---|---|---|---|---|---|
| | Toner | | | | | | | | | | | | | | | | |
| | Example | | | | | | | | | | | | | | Comparative Example | | |
| Test item | 1 | 2 | 3 | 4 | 5 | 6 | 7 | 8 | 9 | 10 | 11 | 12 | 13 | 14 | 1 | 2 | 3 |
| Resolution | 4.0 | 4.0 | 5.0 | 5.0 | 4.0 | 4.0 | 5.0 | 5.0 | 5.0 | 4.0 | 5.0 | 4.0 | 5.0 | 5.0 | 3.2 | 3.2 | 3.2 |
| Image intensity | 1.2 | 1.2 | 1.3 | 1.3 | 1.2 | 1.2 | 1.4 | 1.4 | 1.3 | 1.2 | 1.4 | 1.3 | 1.4 | 1.4 | 1.1 | 1.2 | 1.1 |
| Gradient | 5 | 5 | 5 | 6 | 5 | 5 | 6 | 6 | 5 | 5 | 5 | 5 | 5 | 6 | 4 | 4 | 4 |

EXAMPLE 16

(1) Dispersion by Emulsification and Production of Polymerization Liquid

In a 3-liter stainless steel beaker, were placed 100 g of grafted carbon (Graft Carbon GP-E-2, a trade name, mfd. by Ryoyu Kogyo Kabushiki Kaisha), 400 g of styrene and 120 g of butyl acrylate, respectively as a polymerizable monomer, 12 g of azobisisobutyronitrile, and 0.6 g of t-dodecyl mercaptan as a chain transfer agent, and the whole was mixed and dispersed for 30 minutes by means of a high-speed shear dispersing machine (TK Homomixer, a trade name, mfd. by Tokushuki Kako Kabushiki Kaisha) at 3000 r.p.m.

To the liquid dispersion of carbon thus obtained, was added then an aqueous solution prepared by dissolving into 1300 g of deionized water 12 g of sodium dodecylbenzene sulfonate, an anionic surface active agent, 3 g of Nonipole PE-68 (a trade name of an oxypropylene-oxyethylene block copolymer, mfd. by Sanyo Chemical Industries, Ltd.) and 3 g of Noigen EA 170 (a trade name of a polyoxyethylene glycol nonylphenyl ether, mfd. by Dai-ichi Kogyo Seiyaku Co., Ltd.), both nonionic surface active agents, each as an emulsifier. The resulting mixture was emulsified for 30 minutes by means of a high-speed shear dispersing machine (TK Homomixer, a trade name, mfd. by Tokushiki Kako Kabushiki Kaisha) at 3000 r.p.m. to obtain a black pre-emulsion.

Then, the black pre-emulsion was transferred to a 3-liter, four-necked separable flask equipped with a stirrer, a nitrogen inlet, a thermometer, and a condenser. The pre-emulsion was polymerized under nitrogen gas stream for 5 hours while keeping the temperature in the flask at 80° C., and then cooled to obtain an emulsion polymerization liquid. The conversion was 99.5% or higher. The molecular weight of the polymer obtained was determined by gel chromatography using a calibration curve obtained with standard polystyrene. The weight average molecular weight (Mw) was 80,000 and the number average molecular weight (Mn) was 25,000.

(2) Coagulation Step and Final Step

One liter of the polymerization liquid obtained above was uniformly added dropwise over a period of about 30 minutes into 2 liters of 1% aqueous $MgSO_4$ solution heated at 30° C. with thorough stirring while keeping the temperature of the aqueous solution at 30° C. to effect coagulation. Then, the resulting slurry was kept at the same temperature for 30 minutes and then cooled to room temperature. The slurry was then dehydrated by means of a centrifugal dehydrator, washed three times with warm water at 50° C. and then dried in a drier at 30° to 35° C. to yield a toner. The particle diameter of the toner obtained was measured with a Coulter counter. The particle diameter was 2 to 50 μm and the average particle diameter was 14 μm. The glass transition point (Tg) was 73° C. as determined with a differential scanning calorimeter. Further, the toner was classified into particles of 5 to 25 μm diameter by means of a zigzag classifier (100 MZR, a trade name, mfd. by Alpine Corp.), giving a yield of 85% based on the weight before classification.

EXAMPLE 17 TO 21

One liter of the polymerization liquid obtained in Example 16 was uniformly added dropwise over a period of about 30 minutes into an aqueous solution of a coagulating agent (indicated in Table 7) heated at a coagulation temperature indicated in Table 7 to effect coagulation. The coagulation mixture was maintained at the above-mentioned coagulation temperature during the coagulation, then, after completion of the dropwise addition of the polymerization liquid, further maintained at the same temperature as the above-mentioned coagulation temperature for 30 minutes, and then cooled to room temperature. The resulting coagulated liquid (slurry) was dehydrated with a centrifugal dehydrator. The resulting cake was washed three times with warm water at 50° C. and then dried in a dryer at 30° to 35° C. to yield toner particles.

The particle diameter, the average particle diameter, the yield of particles 5 to 25 μm in diameter, and the glass transition point of the principal resin component of the toner obtained above are shown in Table 7 together with the results obtained in Example 16.

The toners after classification obtained in Examples 16 to 21 were examined for their electrophotographic toner characteristics by using a copying machine for plain paper (U-Bix 1600, a trade name, mfd. by Konishiroku Photo Industry Co., Ltd.) using a commercially available nonconducting carrier. Each of the toners was subjected beforehand to addition treatment with 0.6% and 0.1%, based on the weight of the toner, of a hydrophobic silica (R-972, a trade name, mfd. by Nippon Aerosil Co.) and zinc stearate, respectively, as fluidity improving agents. The test results are shown in Table 7.

TABLE 7

| | Example No. | | | | | |
|---|---|---|---|---|---|---|
| | 16 | 17 | 18 | 19 | 20 | 21 |
| Coagulating agent solution<br>$MgSO_4$ | 1%<br>$MgSO_4$ | 0.5%<br>$MgSO_4$ | 0.3%<br>$MgSO_4$ | 0.3%<br>$MgSO_4$ | 2%<br>$CaCl_2$ | 2%<br>$Al_2Cl_3$ |
| | 2 1 | 2 1 | 2 1 | 2 1 | 1 1 | 1 1 |
| Coagulating agent/Emulsifier | 2.2/1 | 1.1/1 | 0.7/1 | 0.7/1 | 2.2/1 | 2.2/1 |

TABLE 7-continued

| | Example No. | | | | | |
|---|---|---|---|---|---|---|
| | 16 | 17 | 18 | 19 | 20 | 21 |
| (wt. ratio) | | | | | | |
| Coagulation temperature (°C.) | 30 | 70 | 100 | 120 | 100 | 100 |
| Toner particle diameter (μm) | 2-50 | 3-50 | 1-100 | 5-90 | 1-100 | 1-110 |
| Toner average particle diameter (μm) | 14 | 11 | 19 | 18 | 19 | 19 |
| Yield of 5-25 μm particles (%) | 85 | 90 | 85 | 55 | 65 | 55 |
| Tg of principal resin component (°C.) | 73 | 73 | 73 | 73 | 73 | 73 |
| Resolution (lines/inch) | 5.0 | 5.0 | 4.0 | 4.0 | 5.0 | 4.0 |
| Image density | 1.1 | 1.1 | 1.2 | 1.2 | 1.2 | 1.2 |
| Gradient | 6 | 6 | 7 | 6 | 7 | 6 |
| Cleaning property (number of sheets) | 12,000 | 11,000 | ≧12,000 | ≧12,000 | 12,000 | 12,000 |
| Caking resistance | ○ | ○ | ○ | ○ | ○ | ○ |
| Charge stability | ○ | ○ | ○ | ◎ | ○ | ○ |
| Durability | X | Δ | | ◎ | ○ | ○ |
| Moisture resistance (%) | 3.1 | 2.5 | | 0.6 | 0.4 | 0.45 |

EXAMPLE 22 TO 24

Coagulation was conducted in the same manner as in Examples 16 to 21 by using 1 liter of the polymerization liquid obtained in Example 16 and an aqueous solution of a coagulating agent (indicated in Table 8) heated at a coagulation temperature indicated in Table 8. The coagulated liquid (slurry) thus obtained was transferred into an autoclave and heated for 30 minutes at a heat treatment temperature indicated in Table 8. Then, the slurry was cooled and dehydrated, washed with water, and dried in the same manner as in Examples 16 to 21 to obtain a toner.

The particle diameter, the average particle diameter, the yield of particles 5 to 25 μm in diameter, and the electrophotographic characteristics, tested in the same manner as in Examples 16 to 21, of the obtained toner are shown in Table 8.

TABLE 8

| | Example No. | | |
|---|---|---|---|
| | 22 | 23 | 24 |
| Coagulating agent solution | 1% $MgSO_4$ 2 l | 1% $MgSO_4$ 2 l | 0.5% $MgSO_4$ 2 l |
| Coagulating agent/Emulsifier (wt. ratio) | 2.2/1 | 2.2/1 | 1.1/1 |
| Coagulation temp. (°C.) | 30 | 30 | 60 |
| Heat treatment temp. (°C.) | 110 | 140 | 120 |
| Toner particle diameter (μm) | 3-50 | 3-50 | 1-40 |
| Toner average particle diameter (μm) | 13 | 13 | 10 |
| Yield of 5-25 μm particles (%) | 85 | 80 | 90 |
| Tg of principal resin component (°C.) | 73 | 73 | 73 |
| Resolution (lines/inch) | 4.5 | 4.5 | 5.0 |
| Image density | 1.2 | 1.3 | 1.3 |
| Gradient | 7 | 7 | 7 |
| Cleaning property (number of sheets) | ≧12,000 | ≧12,000 | ≧12,000 |
| Caking resistance | ◎ | ◎ | ◎ |
| Charge stability | ◎ | ◎ | ◎ |

EXAMPLE 25

(1) Steps of Dispersion by Emulsification and Production of Polymerization Liquid One hundred grams of grafted carbon, 360 g of styrene, 180 g of butyl methacrylate, 6 g of methacrylic acid, 0.6 g of t-dodecyl mercaptan, 5.2 g of benzoyl peroxide as a polymerization initiator, and 60 g of a low molecular weight polypropylene (Viscole 550P, a trade name, mfd. by Sanyo Chemical Industries, Ltd.) were mixed and dispersed for 30 minutes by means of a high-speed shear dispersing machine (T.K. Hommomixer, a trade name, mfd. by Tokushuki Kako Kabushiki Kaisha) at 3,000 r.p.m.

Then, an aqueous solution prepared by dissolving into 1500 g of deionized water 18 g of sodium dodecylbenzenesulfonate, 4 g of a nonionic surface active agent, Nonipole PE-68 (a trade name, mfd. by Sanyo Chemical Industries, Ltd.) and 4 g of another nonionic surface active agent, Noigen EA 170 (a trade name, mfd. by Dai-ichi Kogyo Seiyaku Co., Ltd.) was introduced to the high-speed shear dispersing machine, and the whole was emulsified at 3000 r.p.m. for 30 minutes at room temperature to obtain a black pre-emulsion.

The black pre-emulsion was transferred to a 3-liter, four-necked separable flask, polymerized under nitrogen gas stream for 5 hours at 70° C., and then cooled to obtain a polymerization liquid.

The conversion was 99.5% or higher. The molecular weight of the polymer was determined in the same manner as in Example 1. The Mw was 86,000 and the Mn was 51,000.

(2) Coagulation Step and Final Step

Toner particles were obtained in the same manner as in Examples 16 to 21 except for using an aqueous solution of a coagulating agent and a coagulation temperature indicated in Table 9.

EXAMPLE 26

The coagulation step and the final step were conducted in the same manner as in Examples 22 to 24 except for using 1 liter of the polymerization liquid obtained in Example 25, and an aqueous solution of a coagulating agent, a coagulation temperature, and a heat treatment temperature indicated in Table 9 to obtain a toner.

The particle diameter, the average particle diameter, the yield of particles 5 to 25 μm in diameter, the glass transition point of the principal resin component, and the electrophotographic characteristics, tested in the same manner as in Examples 16 to 21, of the toners obtained in Examples 25 and 26 are shown in Table 9.

TABLE 9

| | Example No. | |
|---|---|---|
| | 25 | 26 |
| Coagulating agent solution | 0.5% $MgSO_4$ 1 l | 0.5% $MgSO_4$ 1 l |
| Coagulating agent/Emulsifier (wt. ratio) | 0.4/1 | 0.4/1 |
| Coagulation temp. (°C.) | 100 | 60 |
| Heat treatment temp. (°C.) | — | 120 |
| Toner particle diameter (μm) | 4-60 | 2-50 |
| Toner average particle diameter (μm) | 14 | 12 |
| Yield of 5-25 μm particles (%) | 93 | 70 |
| Tg of principal resin component (°C.) | 76 | 76 |
| Resolution (lines/inch) | 5.0 | 5.0 |
| Image density | 1.2 | 1.3 |
| Gradient | 6 | 7 |
| Cleaning property (number of sheets) | ≧12,000 | ≧12,000 |
| Caking resistance | ○ | ◎ |
| Charge stability | ○ | ◎ |
| Durability | ○ | ◎ |
| Moisture resistance | 0.82 | 0.68 |

EXAMPLE 27

(1) Production of Emulsion Polymerization Liquid

An emulsion polymerization liquid was produced in the same manner as in Example 1.

(2) Production of Liquid Dispersion of Offset Prevention Agent

Into a 3-liter autoclave, were placed 750 g of a low molecular weight polypropylene (Viscole 660 P, a trade name, mfd. by Sanyo Chemical Industries, Ltd.), 15 g of sodium dodecylbenzenesulfonate (anionic surface active agent) and 2,235 g of deionized water. The autoclave was tightly closed and heated under pressure to 154° C., which is about 20° C. higher than the melting point of Viscole 660 P. Then, the number of rotations in stirring was increased up to 1000 r.p.m. and the above-mentioned temperature was maintained for 30 minutes. The autoclave was then cooled with continued stirring and the liquid dispersion was taken out. The determination of the particle diameter with a Coulter counter revealed that the average particle diameter of the liquid dispersion obtained was 1.2 μm and no particle having a diameter of 5 μm or larger was contained therein.

(3) Coagulation Step and the Final Step

One liter of the emulsion polymerization liquid produced in (1) and 24 ml of the liquid dispersion produced in (2) were mixed together. No particular phenomenon as agglomeration or precipitation occurred in the mixing. The liquid mixture obtained above was uniformly added dropwise over a period of about 30 minutes into 2 liters of 0.3% aqueous $MgSO_4$ solution heated at 100° C. with thorough stirring while maintaining the temperature of the aqueous solution at 100° C. to effect coagulation. The resulting slurry was kept at the temperature for 30 minutes and then cooled to room temperature. The slurry was dehydrated with a centrifugal dehydrator, washed three times with warm water at 50° C. and dried in a drier at 30° to 35° C. to obtain a toner. The particle diameter of the toner obtained was measured with a Coulter counter. The particle diameter was 1 to 50 μm and the average particle diameter was 13 μm. The glass transition point (Tg) was 73° C. as determined with a differential scanning calorimeter. Further, the toner was classified into particles of 5 to 25 μm diameter by means of a zigzag classifier (100 MZR, a trade name, mfd. by Alpine Corp.), giving a yield of 90% based on the weight before classification.

EXAMPLE 28

The same emulsion polymerization liquid and the same liquid dispersion of the offset prevention agent as used in Example 27 were employed. One liter of the emulsion polymerization liquid was uniformly added dropwise over a period of about 30 minutes into 2 liters of 1% aqueous $MgSO_4$ solution heated at 30° C. with thorough stirring while maintaining the temperature of the aqueous solution at 30° C. to effect coagulation. After the coagulation of the emulsion polymerization liquid had been completed, 24 ml of the liquid dispersion of the offset prevention agent was added dropwise over a period of 10 minutes to the coagulated liquid while stirring the liquid so that the offset prevent slurry was further kept at the temperature for 30 minutes and then cooled to room temperature. Then, the slurry was subjected to centrifugal dehydration, washing and drying in the same manner as in Example 27 to obtain a toner. The toner obtained had a particle diameter of 1 to 50 μm, an average particle diameter of 14 μm, and a glass transition point (Tg) of 73° C.

EXAMPLE 29

A liquid dispersion of a modified polyethylene wax (Sancoat, a trade name, mfd. by Sanyo Chemical Industries, Ltd.) was prepared by using the same procedures as in (2) of Example 27. Then, 18 ml of the said liquid dispersion was added to 1 liter of the emulsion polymerization liquid obtained in (1) of Example 27. The resulting mixture was subjected to the same coagulation and final step as in Example 27 to obtain a toner having a particle diameter of 2 to 100 μm, an average particle diameter of 15 μm, and a glass transition point (Tg) of 73° C. The toner was further subjected to classification to obtain a toner having a particle diameter of 5 to 25 μm.

EXAMPLE 30

(1) Dispersion by Emulsification and Production of Polymerization Liquid

In a 3-liter stainless steel beaker, were placed 100 g of grafted carbon (Graft Carbon GP-E-2, a trade name, mfd. by Ryoyu Kogyo Kabushiki Kaisha), 400 g of styrene and 120 g of butyl acrylate, respectively as polymerizable monomers, 10.4 g of azobisisobutyronitrile as a polymerization initiator, and 0.6 g of t-dodecyl mercaptan as a chain transfer agent, and the whole was mixed and dispersed for 30 minutes by means of a Homomixer at 3000 r.p.m.

To the liquid dispersion thus obtained, was added then an aqueous solution prepared by dissolving into 1420 g of deionized water 12 g of sodium dodecylbenzenesulfonate, anionic surface active agent, 3 g of Nonipole PE-68 (a trade name of an oxypropylene-oxyethylene block copolymer, mfd. by Sanyo Chemical Industries, Ltd.) and 3 g of Noigen EA 170 (a trade name of a polyethylene glycol nonylphenyl ether mfd. by Daiichi Kogyo Seiyaku Co., Ltd.), both nonionic surface active agents, each as an emulsifier. The resulting mixture was further emulsified for 30 minutes by means of a Homomixer at 3000 r.p.m. to obtain a black pre-emulsion.

Then, the black pre-emulsion was transferred to a 3-liter, four-necked separable flask equipped with a stirrer, a nitrogen inlet, a thermometer, and a condenser. The pre-emulsion was polymerized under nitrogen gas stream for 5 hours while keeping the temperature in the flask at 70° C., and then cooled to obtain a polymerization liquid. The conversion was 99.5% or higher. The molecular weight of the polymer was determined by gel chromatography using a calibration curve obtained with standard polystyrene. The weight average molecular weight (Mw) was 65,000 and the number average molecular weight (Mn) was 30,000.

(2) Coagulation Step and Final Step

One liter of the emulsion thus prepared and 24 ml of a liquid dispersion prepared in the same manner as in (2) of Example 27 were mixed and subjected to the coagulation and the final step in the same manner as in Example 27 to obtain a toner having a particle diameter of 3 to 120 μm, an average particle diameter of 17 μm and a glass transition point (Tg) of 73° C. The toner was further subjected to classification to obtain a toner having a particle diameter of 5 to 25 μm.

EXAMPLE 31

(Polymerization in the Presence of Offset Prevention Agent)

(1) Production of Emulsion Polymerization Liquid

One hundred grams of grafted carbon, 400 g of styrene, 120 g of butyl acrylate, 0.6 g of t-dodecyl mercaptan, and 12.4 g of low molecular weight polypropylene (Viscole 550P, a trade name, mfd. by Sanyo Chemical Industries, Ltd.) were mixed and dispersed for 30 minutes by means of a Homomixer at 3000 r.p.m.

Then, an aqueous solution prepared by dissolving into 1300 g of deionized water 24 g of sodium dodecylbenzenesulfonate, 6 g of Nonipole PE-68 (a trade name of a nonionic surface active agent, mfd. by Sanyo Chemical Industries, Ltd.), 6 g of Noigen EA-170 (a trade name of a nonionic surface active agent, mfd. by Dai-ichi Kogyo Seiyaku Co., Ltd.), and 12 g of ammonium persulfate as a polymerization initiator was added to the liquid dispersion obtained above, and the resulting mixture was emulsified by stirring with a Homomixer at 3000 r.p.m. for further 30 minutes to obtain a black pre-emulsion.

The black pre-emulsion was then transferred to a 3-liter, four-necked separable flask and polymerized under nitrogen gas stream for 5 hours at 70° C., and then cooled to obtain an emulsion polymerization liquid.

The conversion was 99.5% or higher. The molecular weight of the polymer was determined in the same manner as in Example 1. The number average molecular weight was 21,000 and the weight average molecular weight was 68,000.

(2) Coagulation Step and Final Step

The emulsion polymerization liquid obtained in (1) above was subjected to coagulation step and final step under the same conditions as in Example 27 (1% aqueous $MgSO_4$ solution, 30° C.) except for omitting the addition of the offset prevention agent. The resulting product was further classified to obtain a toner.

The toners obtained in Examples 27 to 31 and Example 3 were examined for their electrophotographic toner characteristics by using a copying machine for plain paper (U-Bix 1600, a trade name, mfd. by Konishiroku Photo Industry Co., Ltd.). Each of the toners was subjected beforehand to addition treatment with 0.6% and 0.1%, based on the weight of the toner, of a hydrophobic silica (R-972, a trade name, mfd. by Nippon Aerosil Co.) and zinc stearate, respectively, as fluidity improving agents. The test results are shown in Table 10.

TABLE 10

| | | Example No. | | | | | |
|---|---|---|---|---|---|---|---|
| | | 27 | 28 | 29 | 30 | 3 | 31 |
| | | Name | | | | | |
| | | Viscole 660P | Viscole 660P | Sancoat | Viscole 660P | — | Viscole 550P |
| Offset prevention agent | Amount (Solid ratio) (%) | 2 | 2 | 1.5 | 2 | — | 2 in polymerization |
| Resolution (lines/inch) | | 5.0 | 4.0 | 5.0 | 5.0 | 4.0 | 4.0 |
| Image density | | 1.2 | 1.2 | 1.2 | 1.2 | 1.2 | 1.2 |
| Gradient | | 6 | 6 | 5 | 6 | 6 | 6 |
| Cleaning property (number of sheets) | | 12,000 | ≧12,000 | 10,000 | 11,000 | 10,000 | 11,000 |
| Caking resistance | | ○ | ○ | ○ | ○ | ○ | ○ |
| Change stability | | ○ | ○ | ○ | ○ | ○ | ○ |
| Durability | | ○ | ○ | ○ | ○ | ○ | ○ |
| Moisture absorption (%) | | 1.1 | 1.0 | 0.95 | 0.50 | 0.9 | 1.0 |
| Offset resistance | 140° C. | ○ | ○ | ○ | ○ | ○ | ○ |
| | 150° C. | ○ | ○ | ○ | ○ | ○ | ○ |
| | 160° C. | ○ | ○ | ○ | ○ | X | ○ |
| | 170° C. | ○ | ○ | ○ | ○ | X | X |

TABLE 10-continued

| | Example No. | | | | | |
|---|---|---|---|---|---|---|
| | 27 | 28 | 29 | 30 | 3 | 31 |
| | Name | | | | | |
| | Viscole 660P | Viscole 660P | Sancoat | Viscole 660P | — | Viscole 550P |
| 180° C. | | | | | X | X |

EXAMPLE 32 TO 34

(1) Production of Emulsion Polymerization Liquid

In a 3-liter stainless steel beaker, were placed 100 g of grafted carbon (Graft Carbon GP-E-2, a trade name, mfd. by Ryoyu Kogyo Kabushiki Kaisha), 360 g of styrene, 180 g of butyl methacrylate and 6 g of methacrylic acid, each as a polymerizable monomer, and 0.6 g of t-dodecyl mercaptan, and the whole was mixed and dispersed for 30 minutes by means of a Homomixer at 3000 r.p.m.

Then, an aqueous solution prepared by dissolving into 1470 g of deionized water 18 g of sodium dodecylbenzenesulfonate, 4 g of Nonipole PE-68 (a trade name of a nonionic surface active agent, mfd. by Sanyo Chemical Industries, Ltd.), 9 g of ammonium persulfate, and 10 g of an aqueous hydrogen peroxide solution (30%) was introduced into the Homomixer, and the whole was emulsified at 3000 r.p.m. for 30 minutes to obtain a black pre-emulsion.

The black pre-emulsion was then transferred to a 3-liter, four-necked separable flask, polymerized under nitrogen gas stream for 5 hours at 70° C. and then cooled to give an emulsion polymerization liquid.

The conversion was 99.5% or higher. The determination of molecular weight of the polymer conducted in the same manner as in Example 1 showed that the Mw was 96,000 and Mn was 39,000.

(2) Coagulation Step and Final Step

The same coagulation step and final step as in Example 27 was conducted to obtain a toner by using the emulsion polymerization liquid obtained in (1) above and by using the liquid dispersion of low molecular weight polypropylene (Viscole 660P) used in Examples 27 and 28 or the emulsion of modified polyethylene wax (Sancoat) used in Example 29. The toner obtained was further classified and subjected to the same tests as in Examples 27 to 29. The test conditions and results are shown in Table 11.

TABLE 11

| | | Example No. | | |
|---|---|---|---|---|
| | | 32 | 33 | 34 |
| | | Name | | |
| | | Viscole 660P | Viscole 660P | Sancoat |
| Offset prevention agent | Amount (Solid ratio) (%) | 2 | 2 | 1.5 |
| | Time of addition | Before coagulation | After coagulation | Before coagulation |
| Toner particle diameter before classification (μm) | | 0.5–70 | 1–100 | 1–50 |
| Toner average particle diameter before classification (μm) | | 15 | 13 | 15 |
| Tg of principal resin component (°C.) | | 76 | 76 | 76 |
| Resolution (lines/inch) | | 6 | 5 | 5 |
| Image density | | 1.3 | 1.3 | 1.3 |
| Gradient | | 6 | 6 | 6 |
| Cleaning property (number of sheets) | | ≧12,000 | ≧12,000 | ≧12,000 |
| Caking resistance | | ○ | ○ | ○ |
| Charge stability | | ○ | ○ | ○ |
| Durability | | ○ | ○ | ○ |
| Moisture absorption | | 0.8 | 0.85 | 0.95 |
| Offset resistance | 140° C. | ○ | ○ | ○ |
| | 150° C. | ○ | ○ | ○ |
| | 160° C. | ○ | ○ | ○ |
| | 170° C. | ○ | ○ | ○ |
| | 180° C. | ○ | ○ | ○ |

What is claimed is:

1. A process for producing a toner for electrophotography which comprises polymerizing a polymerizable monomer dispersed by emulsification in the presence of a colorant and/or a magnetic powder to prepare a principal resin component, effecting the coagulation of the resulting polymerization liquid by adding a coagulating agent in such a way that the particles in the liquid after coagulation have diameters suitable as a toner, and then heating the resulting coagulated liquid at a temperature no lower than the glass transition point of the principal resin component after coagulation.

2. A process according to claim 1, wherein the heating of the particles is conducted by heating the polymerization liquid after coagulation.

3. A process according to claim 1, wherein the heating of the particles is conducted at a temperature not lower than the glass transition point of the principal resin component and not higher than 150° C.

4. A process according to claim 1, wherein the heating of the particles is conducted at a temperature 25° to 60° C. higher than the glass transition point of the principal resin component.

5. A process according to claim 1, wherein the coagulating agent is added in the coagulation in an amount of 0.1 to 5 times the weight of the emulsifier present in the polymerization liquid.

6. A process according to claim 1, wherein the polymerization initiator used in the polymerization is an oil soluble initiator and/or a water soluble initiator.

7. A process according to claim 1, wherein the dispersion by emulsification is conducted by means of a high-speed shear dispersing machine.

8. A process according to claim 1, wherein the polymerizable monomer comprises 40 100% by weight of styrene or one or more derivatives thereof.

9. A process according to claim 1, wherein a liquid dispersion of an offset prevention agent is added to the polymerization liquid at the time when the conversion is 95% by weight or higher.

10. A process according to claim 1, wherein a liquid dispersion of an offset prevention agent is added to and mixed with the polymerization liquid before or after the coagulation.

11. A process according to claim 1, wherein the particles after coagulation are washed with warm water.

12. A process according to claim 11, wherein the temperature of the warm water is 40° to 60° C.

13. A process for producing a toner for electrophotography which comprises polymerizing a polymerizable monomer dispersed by emulsification in the presence of a colorant and/or a magnetic powder to prepare a principal resin component, effecting the coagulation of the resulting polymerization liquid by adding a coagulant in such a way that the particles in the liquid after coagulation have diameters suitable as a toner, and then heating the resulting coagulated liquid at a temperature not lower than the glass transition point of the principal resin component after coagulation.

14. A process according to claim 13, wherein the heating of the resulting coagulated liquid is conducted at a temperature not lower than the glass transition point of the principal resin component and not higher than 150° C.

15. A process according to claim 13, wherein the heating of the resulting coagulated liquid is conducted at a temperature 25° to 60° higher than the glass transition point of the principal resin component.

* * * * *